Oct. 21, 1924.
G. H. MAXWELL
1,512,230
SHOE BOTTOM FILLER MACHINE
Original Filed April 19, 1923
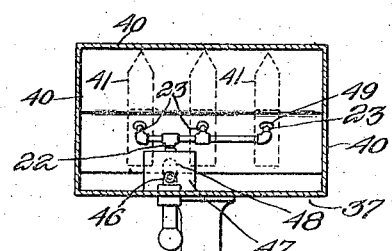
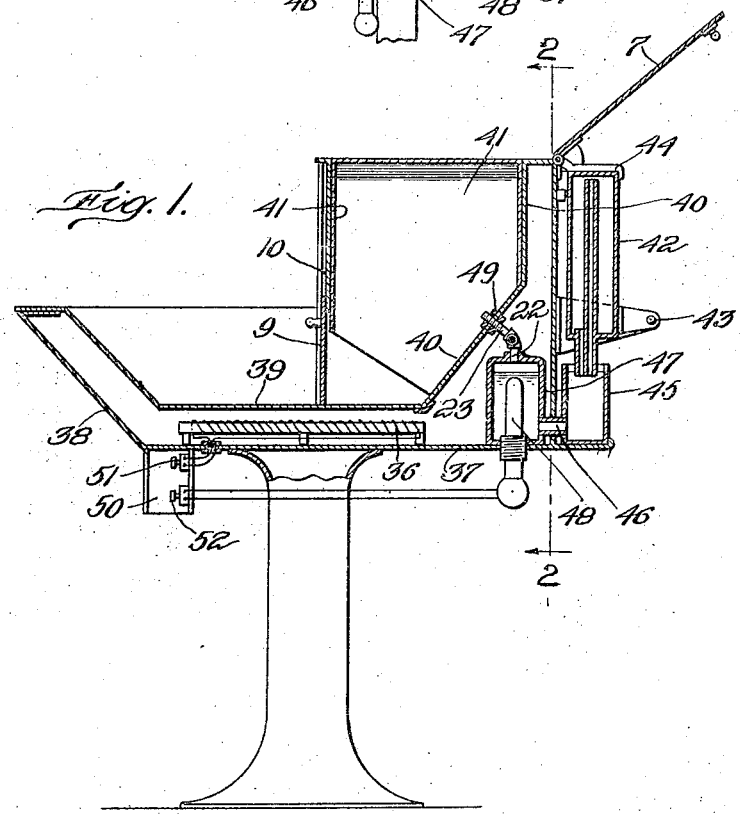
Inventor:
George H. Maxwell.

Patented Oct. 21, 1924.

1,512,230

UNITED STATES PATENT OFFICE.

GEORGE H. MAXWELL, OF PHOENIX, ARIZONA.

SHOE-BOTTOM-FILLER MACHINE.

Original application filed April 19, 1923, Serial No. 633,148. Divided and this application filed August 9, 1923, Serial No. 656,497. Renewed August 11, 1924.

*To all whom it may concern:*

Be it known that I, GEORGE H. MAXWELL, a citizen of the United States, and a resident of Phoenix, county of Maricopa, and State of Arizona, have invented a new and useful Shoe-Bottom-Filler Machine, of which the following is a specification.

My present invention is an apparatus for use in filling shoe-bottoms with heated or heat-softened and plastic filler, this application being a division of application Serial No. 633,148, filed April 19, 1923. The present application is restricted to the adapting of my invention better to electricity, and, among other advantages, makes special provision to maintain the heating chamber dry and free of moisture, although generating the steam within it. I have found that much of the trouble experienced in the electrically heated filler machines has been due to the presence of moisture in the chamber containing the heating element and also that much finer control of the conditioning of the filler is possible by maintaining a dry heat around the filler containing chamber and a moist heat within the filler containing chamber. The claims for the dry heat feature however are contained in my copending application Serial No. 656,496 filed August 9, 1923.

In the accompanying drawings Fig. 1 is a central vertical section of a preferred embodiment of the electric machine; and Fig. 2 is a vertical sectional detail on a reduced scale, taken on the line 2—2, Fig. 1.

As this is a divisional application I refer to the parent case for a more detailed explanation of the features in common between the two cases and which are covered by claims in the parent case. Using the same reference numerals as in the parent case, the main heating unit or units 36 are mounted on a bottom 37 of an outer casing 38 which contains and supports all the rest of the machine. An inner portion, preferably of sheet brass or other sheet metal, extends forward to constitute a work-basin 39 and rearward or upward to constitute the hopper or reservoir 40 closed by slide door 9, 10 and lid 7. To this are secured the radiators or flues 41 for radiating dry heat into the filler mass, and when heated by steam these are open at their bottom and forward end as shown, and otherwise closed. Preferably these are heated by steam instead of dry heat alone. The heater 36 is at such a distance below said inner portion as to provide a heat disseminating space or chamber below the bottom of the work-basin and reservoir to render the heat all around the basin and reservoir uniform and to prevent localizing undue heat at any one spot or region which would burn the filler. The claims for this feature are contained in my copending application Serial No. 633,148, filed April 19, 1923. This construction distributes the heat from the heater 36 through the air before reaching the parts 39 and 40 and insures a safe heat for the filler even though the current in the unit itself should be left turned on carelessly. A water tank 42 is pivoted at 43 on brackets at the back of the reservoir and held upright by a hook 44, being constructed and operating as in my application Serial No. 560,800 to drip into a water seal 45. The latter connects at 46 to an internal water basin or steam producer 47 containing an electric immersion unit 48 below and within it screwed into its lower end from the outside of the apparatus. This location of the water basin 47 formed as an internal tank conserves the heat, utilizing to some extent also the heat from the main heater and permits of easy cleaning out through its bottom opening. At its upper end the water basin and steam producer 47 has a delivery pipe 22 tapped into it with branches 23 for delivering steam into the reservoir 40, said branches preferably extending into the radiators or flues 41. In order to keep all moisture away from the heating units 36, the pipes 23 are secured with a tight joint 49 to the rear inclined portion of the bottom of the reservoir 40 although in any instance where this advantage is not required or desired any of the forms of admission of the steam may be used as shown in the parent case or any other of my copending cases. The current-supply wires from the units 36 and 48 and from the roll 11 and knife block 12 are led to a switch box 50 and preferably to separate suitable switches at 51, 52 in well-known or convenient manner.

In use the operator turns on the current and fills the hopper or reservoir with filler. The work-basin and reservoir are quickly surrounded by a dry heat from the heating units and the reservoir and contained filler are filled and permeated with steam from steam generator 47. As the melting or softening and disintegrating filler begins dropping down and slumping forward into the work-basin, the operator observes whether the filler is too moist. If it is too moist, he cuts off the steam according to his judgment by the switch 52, but without slowing down the process as the dry heat remains radiating copiously from the heater 36 and the steam producer 47. If the dry heat seems too severe, he is able to cut this down, with or without a corresponding reduction of moisture in the filler, but the machine is so constructed with the heat disseminating space or chamber previously mentioned as to render the dry heat always safe. The arrangement is also advantageous in permitting the desired continuous high heat in the heating roll and knife block irrespective of the amount of heat in the reservoir. The construction explained is such that the operator is able at all times to temper the filler exactly as required by the peculiarities of the given batch of filler he is using, by the condition of the weather, and by the kind of shoes he is working on, or according to his speed as a workman. All parts can be kept independently as near the highest speed efficiency as is permitted by safety, and the apparatus is simple, economical in use, and does not require a high-grade intelligence to operate it.

As already intimated, I do not restrict my invention to the precise embodiment of the drawings as various modifications, rearrangements and substitutions are contemplated within the spirit and scope of the claims, as well as various sub-combinations, all as will be apparent to those skilled in such matters. The generic claims for the general electric construction and the features which include the dry heat chamber and separate steam or moisture basin or generator, main heater combined with separate steam producer, automatic water supply pipe or nozzle jet delivery of steam, radiator or flue construction, and certain other matters herein shown but not herein claimed are duly claimed in applications Serial No. 560,800 filed May 13, 1922, 633,148 filed April 19, 1923, and 656,496 filed August 9, 1923. The trying conditions and peculiarities of the general method of filling shoe-bottoms involved in the present application are set forth at length in the Thoma Patent No. 1,225,372, patented May 8, 1917 which (together with the process patent there mentioned and dating back to 1907) marks the beginning of the use of steam in this art. The system was introduced to the trade and the patents mentioned owned then and now by the present applicant.

The claims are as follows:—

1. A machine of the kind described, comprising a filler supply reservoir for holding and conditioning for use a supply of granular, sticky shoe-bottom filler of the kind which is normally solid and impervious to quick heat penetration but capable of being softened by heat and then quick setting when allowed to cool in a shoe-bottom, said reservoir being adapted to handle filler of the aforesaid character and having a plurality of openings through its bottom for the admission of steam, means for holding a supply of water immediately below said bottom from which to deliver steam through said openings into the filler, and an electric heating unit extending into said water supply for generating steam and driving the heat and moisture up into and through said filler.

2. A machine of the kind described, comprising a filler supply reservoir for holding and conditioning for use a supply of granular, sticky shoe-bottom filler of the kind which is normally solid and impervious to quick heat penetration but capable of being softened by heat and then quick setting when allowed to cool in a shoe-bottom, said reservoir being adapted to handle filler of the aforesaid character and having a plurality of openings through its bottom for the admission of steam, means for holding a supply of water immediately below said bottom from which to deliver steam through said openings into the filler, an electric heating unit extending into the water in said water holding means for generating steam and driving the heat and moisture up into and through said filler, means for feeding water to said water holding means, and controlling means for regulating the delivery of said steam to the filler in the reservoir.

3. A machine of the kind described, comprising a filler supply reservoir for holding and conditioning for use a supply of granular, sticky shoe-bottom filler of the kind which is normally solid and impervious to quick heat penetration but capable of being softened by heat and then quick setting when allowed to cool in a shoe-bottom, said reservoir being adapted to handle filler of the aforesaid character and having a plurality of openings through its bottom for the admission of steam, means for holding a supply of water immediately below said bottom from which to deliver steam through said openings into the filler, an electric heating unit extending into the water in said water holding means for generating steam and driving the heat and moisture up into and through said filler, automatic water feeding means to provide a desired supply of water to be operated upon by said electric unit, and controlling means for regulating the delivery of said steam to the filler in the reservoir.

4. In a machine of the kind described, a filler supply reservoir and work-basin, a heat radiator and steam flue extending within said reservoir for hastening the melting and conditioning of the filler, main heating means for said apparatus, separate steam producing means having independent steam connection with said flue, and independent regulating means for said steam producing means.

5. In a machine of the kind described, a filler supply reservoir and work-basin, a heat radiator and steam flue extending within said reservoir for hastening the melting and conditioning of the filler, main heating means for said apparatus, and separate steam producing means having independent steam connection with said flue, and independent regulating means for said steam producing means, and including an automatic water supply connected therewith.

6. In a machine of the kind described, a filler supply reservoir and work-basin, a heat radiator and steam flue extending within said reservoir for hastening the melting and conditioning of the filler, main heating means for said apparatus, and combined water supplying and steam producing means under the influence of said heating means but maintaining the steam independent of said main heating means and having independent steam connection with said flue.

7. In a machine of the kind described, a filler supply reservoir and work-basin, a heat radiator and steam flue extending within said reservoir for hastening the melting and conditioning of the filler, main heating means for said apparatus, and combined water supplying and steam producing means under the influence of said heating means but maintaining the steam independent of said main heating means and having independent steam connection with said flue, the aforesaid construction being arranged to maintain dry heat below said supply reservoir and work-basin and moist heat in said reservoir.

8. In a machine of the kind described, a filler supply reservoir and work-basin, a heat radiator and steam flue extending within said reservoir for hastening the melting and conditioning of the filler, main heating means for said apparatus, and separate steam producing means having independent steam connection with said flue, and independent regulating means for said steam producing means, and including a water-tank and an immersion electric unit therein.

9. In a machine of the kind described, a filler supply reservoir and work-basin, a heat radiator and steam flue extending within said reservoir for hastening the melting and conditioning of the filler, a main electric heater for said apparatus, and a separate electric heater and water supply for furnishing steam to said steam flue and radiator, said two heaters having independent current controlling means.

10. In a machine of the kind described, a filler supply reservoir and work-basin, a heating chamber therebelow, a main electric heater mounted in said chamber below said work-basin and reservoir and spaced therefrom to provide an intervening air circulation space capable of distributing the heat generally over the surface to be heated and of preventing localizing the heat in one spot to burn the filler, a plurality of steam flues extending within the reservoir, and separate steam-supply means having connection with said steam flues for delivering steam into the flues and thence into the filler in the reservoir.

11. In a machine of the kind described, a filler supply reservoir and work-basin, a heating chamber therebelow, a main electric heater mounted in said chamber below said work-basin and reservoir and spaced therefrom to provide an intervening air circulation space capable of distributing the heat generally over the surface to be heated and of preventing localizing the heat in one spot to burn the filler, a plurality of steam flues extending within the reservoir, and separate steam-supply means extending within said chamber and having connection with said steam flues for delivering steam into the flues and thence into the filler in the reservoir.

12. In a machine of the kind described, a filler supply reservoir and work-basin, a heating chamber therebelow, a main electric heater mounted in said chamber below said work-basin and reservoir and spaced therefrom to provide an intervening air circulation space capable of distributing the heat generally over the surface to be heated and of preventing localizing the heat in one spot to burn the filler, a plurality of steam flues extending within the reservoir, and a water supply extending into said chamber and thence into said flues, and separate electric heating means and control for said water supply.

GEORGE H. MAXWELL.

Witnesses:
ANDREW THOMA,
NORMAN J. WESTHAVER,
O. D. HOGUE.